United States Patent [19]

Lerude

[11] Patent Number: 5,657,052
[45] Date of Patent: Aug. 12, 1997

[54] KEYPAD DIALOG TERMINAL

[75] Inventor: Gérard Lerude, Antibes, France

[73] Assignee: AEG Schneider Automation, Valbonne, France

[21] Appl. No.: 425,042

[22] Filed: Apr. 18, 1995

[30] Foreign Application Priority Data

Nov. 30, 1994 [FR] France .................. 94 14498

[51] Int. Cl.⁶ .................. G06F 3/00; G09G 5/00
[52] U.S. Cl. .................. 345/168; 341/23; 341/22; 341/34; 364/709.01; 364/709.1; 364/708.1
[58] Field of Search .................. 345/168; 364/708.1, 364/709.01, 709.1, 709.12; 341/22, 28, 34, 23

[56] References Cited

U.S. PATENT DOCUMENTS

| | | | |
|---|---|---|---|
| 3,978,328 | 8/1976 | Fabry et al. | 364/709.01 |
| 4,092,527 | 5/1978 | Luecke | 364/709.01 |
| 4,279,021 | 7/1981 | See et al. | 364/709.01 |
| 4,890,832 | 1/1990 | Komaki | 341/23 |
| 5,373,458 | 12/1994 | Bishay et al. | 364/708.1 |

*Primary Examiner*—Donnie L. Crosland
*Attorney, Agent, or Firm*—Oblon, Spivak, McClelland, Maier & Neustadt, P.C.

[57] ABSTRACT

A keypad dialog terminal in particular for dialog with a programmable automatic controller, comprising a casing (1) carrying a dialog screen (12) and a set of contacts (32) associated with a keypad (22), characterised in that the casing (1) comprises a casing body (11) carrying the fixed contacts and a removable dialog module (2) comprising a frame (21) closed by a visible top membrane (22) which forms various projecting keys and carries the mobile contacts (26), this frame (21) having removable locking apparatus (24, 25) adapted to cooperate with conjugate locking apparatus (14, 15) on the lateral sides of the casing body (11).

6 Claims, 1 Drawing Sheet

KEYPAD DIALOG TERMINAL

The present invention concerns a keypad dialog terminal, in particular for dialog with a programmable automatic controller, comprising a casing having a dialog screen and a set of contacts associated with a keypad.

Dialog terminals of the above type are used for dialog with a programmable automatic controller.

The prior art includes terminals that can be customized by using markings suited to the language, software and working practises of the user. Such terminals usually have purely graphical key symbols carried by a film.

An object of the present invention is to provide a dialog terminal the keypad of which can easily be changed.

The terminal is characterized in that the casing comprises a casing body carrying the fixed contacts and includes a removable dialog module constituted by a frame closed by a visible membrane at the top which forms various projecting keys and carries the mobile contacts, this frame being provided with removable locking means adapted to cooperate with conjugate locking means disposed on the lateral sides of the casing body.

In accordance with one feature of the invention the module includes a bottom membrane under the visible membrane, both membranes being glued to the perimeter of the frame.

In accordance with another feature of the invention the bottom face of the top membrane carries conductive lands under the projecting keys, facing the fixed contacts and adapted to cooperate with the fixed contacts.

In accordance with a further feature of the invention the casing body has lateral locking grooves on both sides and the walls of the frame have locking lugs adapted to engage in the grooves.

The invention will now be described in more detail and by way of example with reference to one embodiment of the invention shown in the appended drawings, in which.

Figure 1:
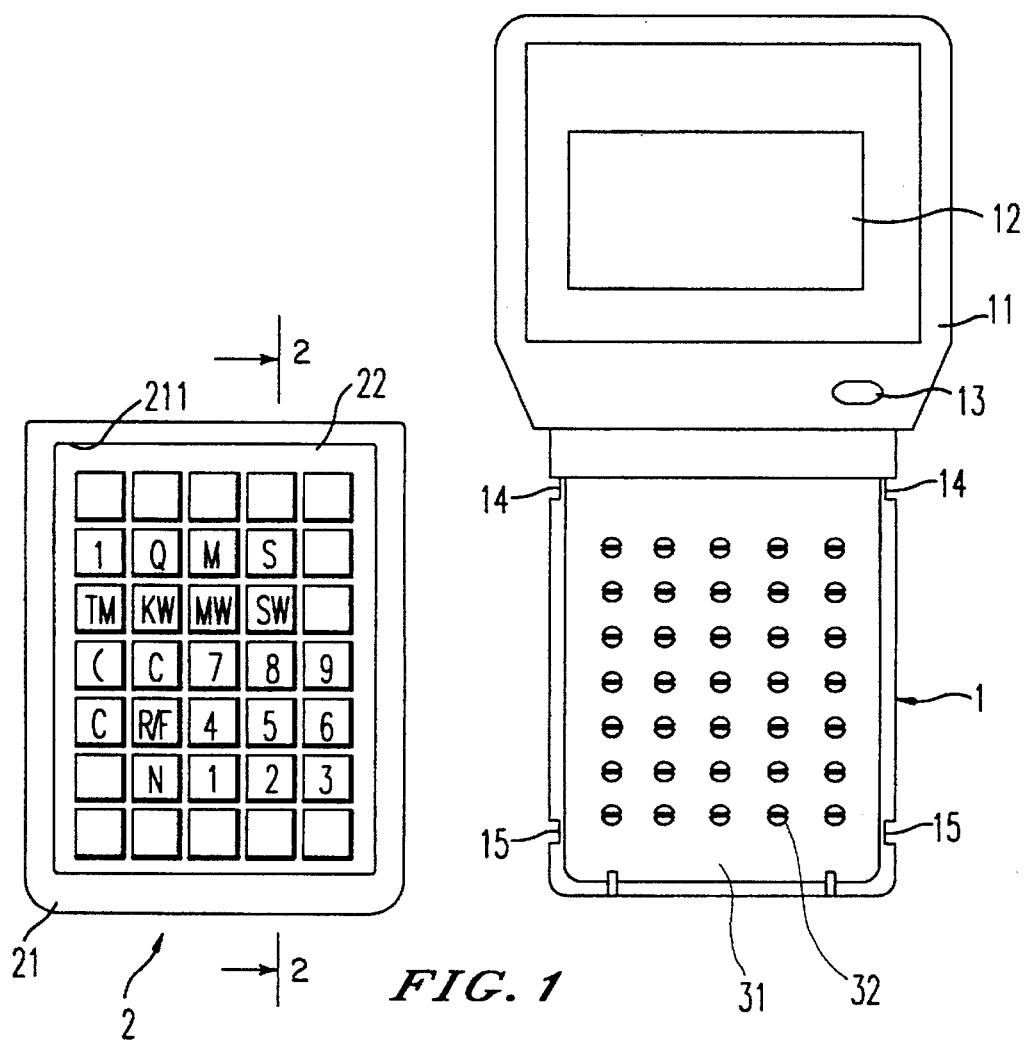
FIG. 1 is an exploded elevation view of a dialog terminal in accordance with the invention.
Figures 2, 4:
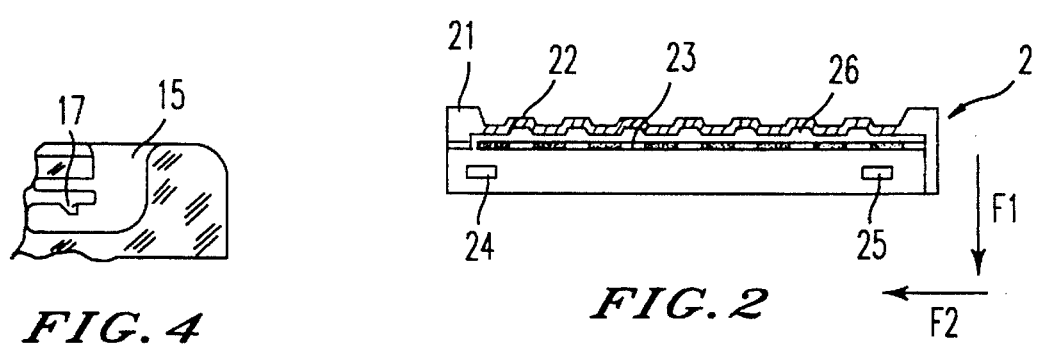
FIG. 2 is a view of a removable module from FIG. 1 in section on A—A.
FIG. 4 shows part of FIG. 3 in more detail.
Figure 3:
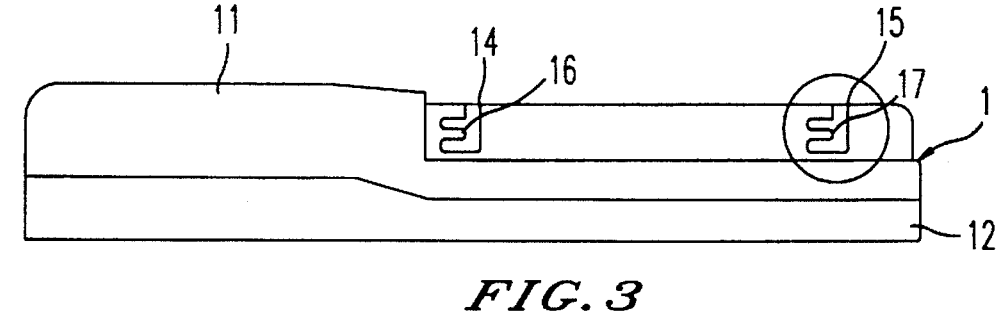
FIG. 3 is side view of a bottom part of the terminal.

The dialog terminal shown in the drawings includes a casing 1 made up of a casing body 11 and a back 12 both made of plastics material. The casing body has a dialog screen 12 of the liquid crystal display (LCD) or some other type and an on-off button 13. The body is closed by a plate 31 carrying fixed contacts 32 laid out in an orderly manner.

The casing body 1 is associated with a removable dialog module 2 carrying markings and mobile contacts. It comprises a frame 21 including an opening 211 closed by a top membrane 22 which forms various dome-shaped projecting keys which can be depressed by the operator and which have on the top face the key markings or other markings. Under the visible membrane 22 is a bottom membrane 23 which provides a passage for air between the dome-shape keys.

Both membranes 22 and 23 are glued to the perimeter of the frame 21 on the inside, which stiffens both membranes. The bottom face of the top membrane 22 carries conductive lands 26 under the projecting keys, facing the fixed contacts 32 and adapted to cooperate with the fixed contacts.

The dialog module 2 is locked to the casing body 1 by elastic lateral locking means. The casing body 11 has lateral locking grooves 14 and 15 on both sides and the walls of the frame 21 have locking lugs 24 and 25. Each locking groove 14, 15 has a respective elastic tongue 16, 17 which locks the lug behind a detent.

The module is assembled to the body by engaging the lugs 24, 25 in the grooves 14, 15 in the direction of the arrow F1 and then pushing the module towards the screen in the direction of the arrow F2. During this latter movement in translation the module is locked to the elastic tongues.

The play between the two parts of the keypad is defined by the tolerance and the relative position of the module and the body.

Of course, variants, improvements of detail and even the use of equivalent means can be considered without departing from the scope of the invention.

I claim:

1. A terminal for entering data, said terminal comprising:

a main body carrying an array of fixed contacts and body elements for aiding in establishing a releasable locking of a key module in a cooperating relationship with said array of fixed contacts;

said key module having a top membrane that has projecting portions thereof defining keys with each defined key carrying a moveable contact engageable with said fixed contacts when said cooperating relationship is established; and said top membrane being placed over and enclosing a frame which carries frame members for acting with said body elements in establishing said releasable locking.

2. A terminal as claimed in claim 1, wherein said key module further has a second membrane mounted beneath the top membrane, said second membrane and said top membrane being glued to a perimeter area of said frame.

3. A terminal as claimed in claim 1, wherein said moveable contact is formed as a conductive land beneath each one of the keys of said top membrane.

4. A terminal as claimed in claim 2, wherein said moveable contact is formed as a conductive land beneath each one of the keys of said top membrane.

5. A terminal as claimed in any one of the preceding claims, wherein said body elements are fashioned as grooves with said frame members being fashioned as lugs to cooperate therewith in establishing said releasable locking.

6. A terminal as claimed in claim 5, wherein said grooves each contain an elastic tongue to engage the lugs in establishing said releasable locking.

* * * * *